A. TISMAN.
AUTOMOBILE BUMPER.
APPLICATION FILED DEC. 29, 1916.
1,220,571.   Patented Mar. 27, 1917.
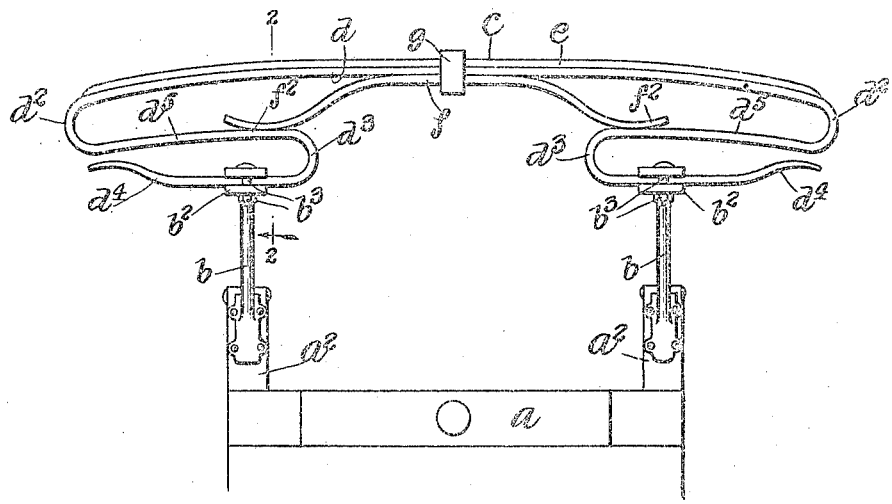
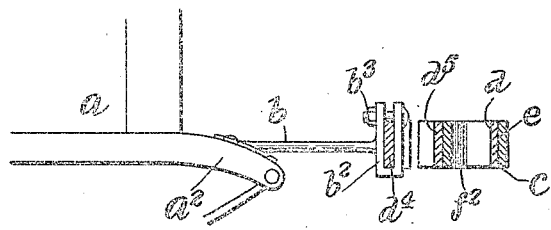
Inventor
Abraham Tisman,
By his Attorneys

UNITED STATES PATENT OFFICE.

ABRAHAM TISMAN, OF NEW YORK, N. Y.

AUTOMOBILE-BUMPER.

1,220,571.  Specification of Letters Patent.  Patented Mar. 27, 1917.

Application filed December 29, 1916. Serial No. 139,442.

*To all whom it may concern:*

Be it known that I, ABRAHAM TISMAN, a subject of the Czar of Russia, and residing at New York, in the county of New York and State of New York, have invented certain new and useful Improvements in Automobile-Bumpers, of which the following is a specification, such as will enable those skilled in the art to which it appertains to make and use the same.

This invention relates to bumpers or buffers for power driven vehicles, and the object thereof is to provide an improved device of this class which is designed to prevent injury to the vehicles in headlong collisions, or to prevent injury to a single vehicle of the class described when it strikes another vehicle or object; a further object being to prevent serious injury to a person struck by an automobile or other power driven vehicle; and with these and other objects in view the invention consists in a device of the class specified, constructed and operating as hereinafter described and claimed.

The invention is fully disclosed in the following specification, of which the accompanying drawing forms a part, in which the separate parts of my improvement are designated by suitable reference characters in each of the views, and in which:—

Figure 1 is a plan view showing my improvement applied to the chassis or truck frame of an automobile; and, Fig. 2 a section on the line 2—2 of Fig. 1.

In the drawing forming part of this specification, I have shown at $a$ a part of a chassis or truck frame of a power driven vehicle, and said chassis or truck frame is provided with forwardly directed side extensions $a^2$ of the usual form and, in the practice of my invention, I secure to the parts $a^2$ forwardly directed supports consisting of rods or arms $b$ in connection with which is mounted a bumper spring device $c$.

The rods or arms $b$ are provided at their front ends with U-shaped keepers $b^2$, and the spring device $c$ consists of a main central plate spring $d$, an outer reinforcing leaf spring $e$ and an inner reinforcing leaf spring $f$, and said springs are connected centrally by a keeper $g$ through which they are passed.

The ends of the main central spring $d$ are made S-shaped in form, or provided with outwardly directed loop members $d^2$ and inwardly directed loop members $d^3$, and the outwardly directed ends $d^4$ of the loop members $d^3$ are passed through the keepers $b^2$ and secured therein by bolts $b^3$.

The outer reinforcing leaf spring $e$ extends approximately the full length of the central part of the main central spring $d$, while the inner reinforcing leaf spring $f$ is shorter than the spring $e$ and the end portions $f^2$ thereof are curved inwardly and bear on the central part $d^5$ of the double loop-shaped or S-shaped ends of said spring $d$.

This construction produces a combination spring action of the separate parts of my improved spring bumper which renders the same very resilient in operation, and at the same time gives it great strength and durability, together with power to resist compact with an object, while yielding freely thereto, and by reason of this fact serious injury to a person struck by the vehicle when in motion is obviated to a large extent, while danger of injuring the vehicle is also reduced to a minimum.

It will be understood that the ends of the spring $f$ are freely movable on the parts $d^5$ of the spring $d$, while the ends of the spring $e$ are freely movable on the main or central part of the spring $d$, and the parts $d^4$ of the spring $d$ may be secured or adjusted in the keepers $b^2$ as may be desired, or said part $d^4$ may be movable in said keepers.

Having fully described my invention, what I claim as new and desire to secure by Letters Patent, is:—

1. A spring bumper for power driven vehicles, comprising supports adapted to be connected with the front end portion of the truck frame and provided at their front ends with keepers, and a spring device mounted transversely and in front of said supports and comprising a main spring the end portions of which are S-shaped in form, and the ends of which are passed outwardly through said keepers, and a central reinforcing spring on the inner side of the central part of the main spring and the ends of which bear on the central parts of the S-shaped end portions of the main spring.

2. A spring bumper for power driven vehicles, comprising supports adapted to be connected with the front end portion of the truck frame and provided at their front ends with keepers, and a spring device mounted transversely and in front of said supports and comprising a main spring the end portions of which are S-shaped in form, and the ends of which are passed outwardly through said keepers, a central reinforcing spring on the inner side of the central part of the main spring and the ends of which bear on the central parts of the S-shaped end portions of the main spring, and another reinforcing spring placed on the outer side of the main spring.

In testimony that I claim the foregoing as my invention I have signed my name in presence of the subscribing witnesses this 27th day of December 1916.

ABRAHAM TISMAN.

Witnesses:
C. E. MULREANY,
H. E. THOMPSON.